US006356956B1

(12) United States Patent
Deo et al.

(10) Patent No.: US 6,356,956 B1
(45) Date of Patent: *Mar. 12, 2002

(54) TIME-TRIGGERED PORTABLE DATA OBJECTS

(75) Inventors: Vinay Deo, Redmond; Robert B. Seidensticker, Jr., Woodinville; Michael J. O'Leary, Redmond, all of WA (US)

(73) Assignee: Microsoft Corporation, Redmond, WA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/710,354

(22) Filed: Sep. 17, 1996

(51) Int. Cl.⁷ .................................................. G06F 9/54
(52) U.S. Cl. .................................... 709/318; 709/200
(58) Field of Search ................................ 395/680, 683, 395/200.53; 345/326; 455/343; 707/104; 709/310–332, 200–219

(56) References Cited

U.S. PATENT DOCUMENTS

| 5,578,991 A | * 11/1996 | Scholder ..................... 340/571 |
| 5,696,900 A | * 12/1997 | Nishigaya et al. ........... 709/229 |
| 5,790,974 A | * 8/1998 | Tognazzini et al. ......... 455/456 |
| 5,819,284 A | * 10/1998 | Forber et al. ................. 707/104 |
| 5,845,204 A | * 12/1998 | Chapman et al. ............ 455/343 |
| 5,929,848 A | * 7/1999 | Albukerk et al. ............ 345/326 |
| 6,006,251 A | * 12/1999 | Toyouchi et al. ............ 709/203 |

OTHER PUBLICATIONS

Smart objects for Dependable Real–Time Systems, Shi–Kuo Chang, Yeng–Jia Chen, Muse, D., Object–Oriented Real–Time Dependable Systems 1994, IEEE, pp. 10–17, Oct. 1994.*
A Periodic Object Model for Real–Time Systems, Callison, H.R., Software Engineering, 1994, Proceedings, ICSE–16, IEEE, pp. 291–300, May 1994.*
Dealing with History and Time in a Distributed Enterprise Manager, Alex Allister Shvartsman, IEEE Network, IEEE, pp. 32–42, Nov. 1993.*
Hindus et al, "Designing auditory interaciotns for PDAs," AOM online, pp 143–146, 1995.*
Varhol, Peter, D., "Windows for Control Freaks: Tired of hard–wiring Windows for multiple processes? Photon lives for event–driven applications for PDAs, process control, and data acquisition," BYTE, Jun. 1995, vol. 20, No. 6, p. 83.*

* cited by examiner

Primary Examiner—St. John Courtenay, III
(74) Attorney, Agent, or Firm—Lee & Hayes, PLLC (57) ABSTRACT

The invention includes a time-triggered data object that is formulated at a host computer and transmitted to a PDA such as a personal electronic information manager that has data reception capabilities. The data object includes a specification of an action to be performed as well as a specification of an initiation time for initiating the specified action. The action can consist of a simple reminder or alarm, or can specify the execution of an application program on the PDA. When a data object is received by the PDA, its action and initiation time are stored in a local database. The PDA monitors the time and the database, and initiates the specified action at the specified time.

45 Claims, 3 Drawing Sheets

TIME-TRIGGERED PORTABLE DATA OBJECTS

TECHNICAL FIELD

This invention relates to personal digital assistants and to methods of scheduling events using such personal digital assistants.

BACKGROUND OF THE INVENTION

In recent years, there has been an increasing use of compact, pocket-size electronic personal organizers that store personal scheduling information such as appointments, tasks, phone numbers, flight schedules, alarms, birthdays, and anniversaries. Such organizers are commonly referred to as personal digital assistants or PDAs. PDAs can be differentiated from more general-purpose computers in terms of size, functionality, and power requirements. PDAs are typically smaller than conventional portable notebook or laptop computers, and are often small enough to fit within a user's pocket or purse. Input is often through a pen instead of a full keyboard or mouse. A PDA display is smaller than a conventional desktop or portable computer. PDAs are usually designed to provide specific functions such as personal organization (calendar, note taking, database, calculator, and so on) as well as communications, although customized applications can be downloaded and executed by some PDAs. Power for PDAs is supplied primarily from batteries, which may or may not be rechargeable. Data storage is usually by means of flash memory rather than power-hungry disk drives.

PDAs now being developed integrate the functions of many devices now used on the road. For instance, PDAs can include communications devices such as cellular telephones and pagers. This allows a personal information manager (PIM) within a PDA to be updated remotely, by transferring data using cellular and paging networks. It is envisioned that devices such as this will be able to receive data and instructions using such communications technologies. In addition, PDAs will be able to exchange data with each other, often without explicit instructions from users.

Even though many PDAs are now very capable, their user interface is often limited because of the desirably small size of such PDAs. This makes it difficult to program many PDAs. One solution to this dilemma is to do all the programming on a more full-functioned device such as a desktop or laptop computer, and to then download information from the computer to the PDA. Devices that work this way are available. Such devices also allow information to be input directly into the PDA, using the available user interface of the PDA.

Many PDAs have certain features that can be programmed to occur at specific times. For example, it is possible to enter an appointment or anniversary into a personal information manager, and have the PDA sound an alarm or display an icon at a specified time before the appointment or anniversary. Similarly, it is possible on some PDAs to disable their paging speakers during certain hours that are specified by the user.

While these time-based functions are useful, they are generally limited to a pre-defined set of functions that a device manufacturer believes will be most widely used.

In the general-purpose computer environment, time-based events are common. For example, the Unix operating system has an "at" command that can be used by an operator to dynamically specify a program and a time for the program's execution. To date, however, it has not been feasible to provide this capability within a PDA.

However, the inventors have recognized the desirability of extending the functionality of a PDA after it has been sold to a consumer. One way to extend device functionality is to allow a user to specify arbitrary actions or events for initiation at specified times.

SUMMARY OF THE INVENTION

In accordance with the invention, events are defined and encapsulated in what are referred to as time-triggered data objects. Each such data object is an independent, self-contained piece of data that specifies both an action and a time for initiating the action.

A data object can be sent to a PDA from different sources, using different available transmission media. The format of a time-triggered data object is the same, however, regardless of the source of the data object.

For example, a time-triggered data object can be sent to a PDA in a paging message. This method of transfer is highly desirable because it can be accomplished without user intervention. Also, time-triggered data objects can be sent by people other than the user of the PDA, such as the user's secretary. Alternatively, a time-triggered message can be transferred using a cellular phone network or using a short-range infrared communications signal.

The PDA accepts time-triggered data objects, and initiates the specified actions at the specified times. Actions will most frequently be simple reminders, accompanied by an alarm. However, an action might also consist of executing a specified application program, and the application program itself can be downloaded to the PDA. This allows tremendous flexibility, and provides a way to extend the capabilities of the PDA.

DETAILED DESCRIPTION OF THE PREFERRED EMBODIMENT

Figure 1:
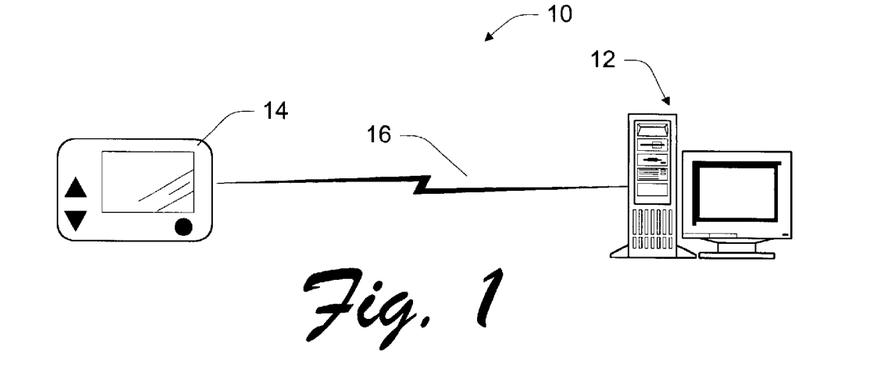
FIG. 1 shows a system that uses time-triggered data objects in accordance with a preferred embodiment of the invention.
Figure 2:
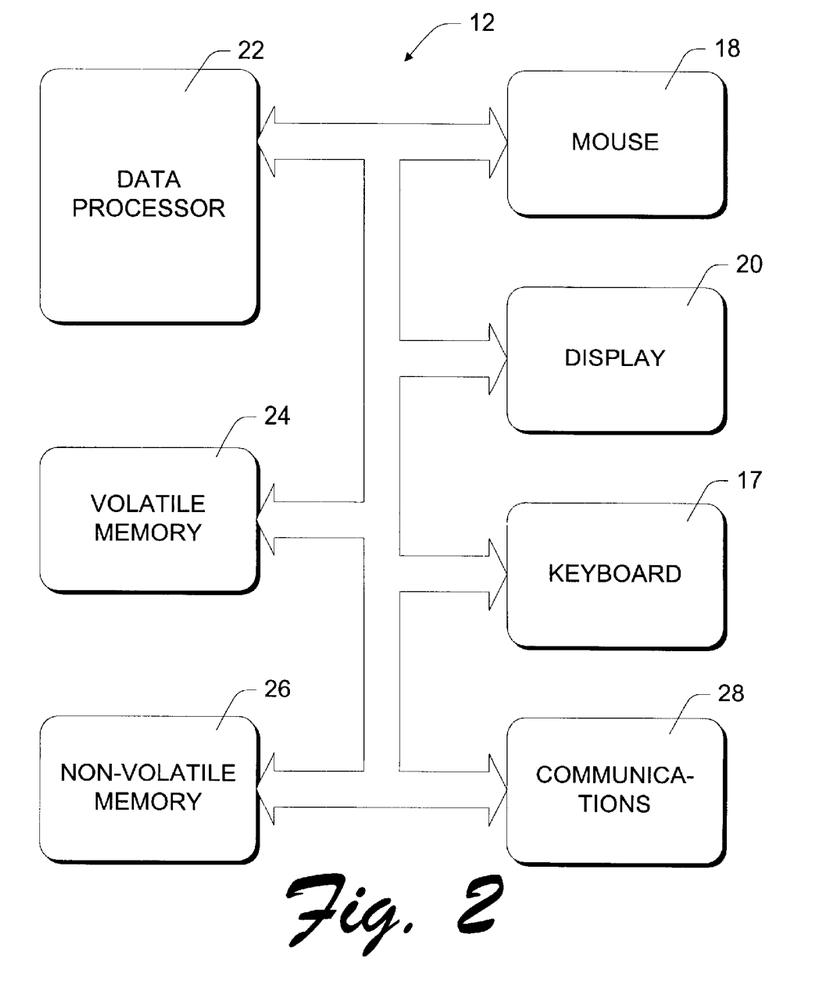
FIG. 2 is a block diagram of a host computer in accordance with the invention.

FIG. 1 shows a system 10 in accordance with a preferred embodiment of the invention. System 10 includes a host or server computer 12 and a personal digital assistant (PDA) 14, connected for uni-directional or bi-directional communications by a data transmission medium 16. Host computer 12 in one embodiment is a typical desktop or portable computer. FIG. 2 shows conventional components of such a computer, including as a keyboard 17, mouse 18, color graphics display 20, data processor 22 (such as an Intel Pentium® or other x86 processor); volatile electronic memory (DRAM) 24 and non-volatile mass-storage 26 such as a hard disk and/or a CD-ROM drive. The computer runs a conventional operating system such as the Windows 95® operating system.

Host computer 12 also has a communications component 28 that is compatible with transmission medium 16. Transmission medium 16 might be a wireless communications system or signal such as an infrared (IR) or radio frequency (RF) communications channel. Alternatively, transmission medium 16 might be a digital wireless paging network or channel, or a digital cellular telephone network. Transmission medium 16 is used to convey data to PDA 14.

Communications component 28 can be an infrared transceiver, wired connection, or any other suitable mechanism for transferring information from computer 12 to PDA 14 when they are in proximity. When they are not in proximity, the communications component can be a component for connecting to a local area network, paging network, cellular network, radio/television network, or any other communication system that can carry communications from computer 12 to PDA 14. As one example, communications component 28 can be a modem. In this case, computer 12 can use the modem to communicate to a paging device within PDA 14.

Instead of a conventional computer, host computer 12 might comprise a service provider or headend that serves a plurality of PDAs. Such a service provider or headend might utilize one or more of a variety of transmissions media, including paging channels, cellular telephone networks, and hardwired wide-area networks such as the Internet.

Host computer 12 might also comprise another PDA, similar or identical to PDA 14. In this case, an IR or RE transmission media would preferably be used as a transmission medium.

Transmission medium 16 can be either unidirectional, from computer 12 to PDA 14, or bi-directional. Most of the features discussed below can be accomplished with a unidirectional transmission medium. Some enhanced functions might be possible when a bi-directional communications channel is available. A particular PDA might be able to receive information using different types of transmission media. For example, a PDA might have an IR port and a paging receiver.

In one embodiment of the invention, the PDA 14 is a wireless pager with enhanced functionality. In contrast to most currently available pagers, PDA 14 uses a touch-sensitive pixel-addressable display for its entire user interface. In addition to conventional paging functions, PDA 14 has what is similar to a personal information manager (PIM) or appointment calendar, in which various events including appointments can be specified and executed. The details of such events will become more apparent as the discussion continues.

Figure 3:
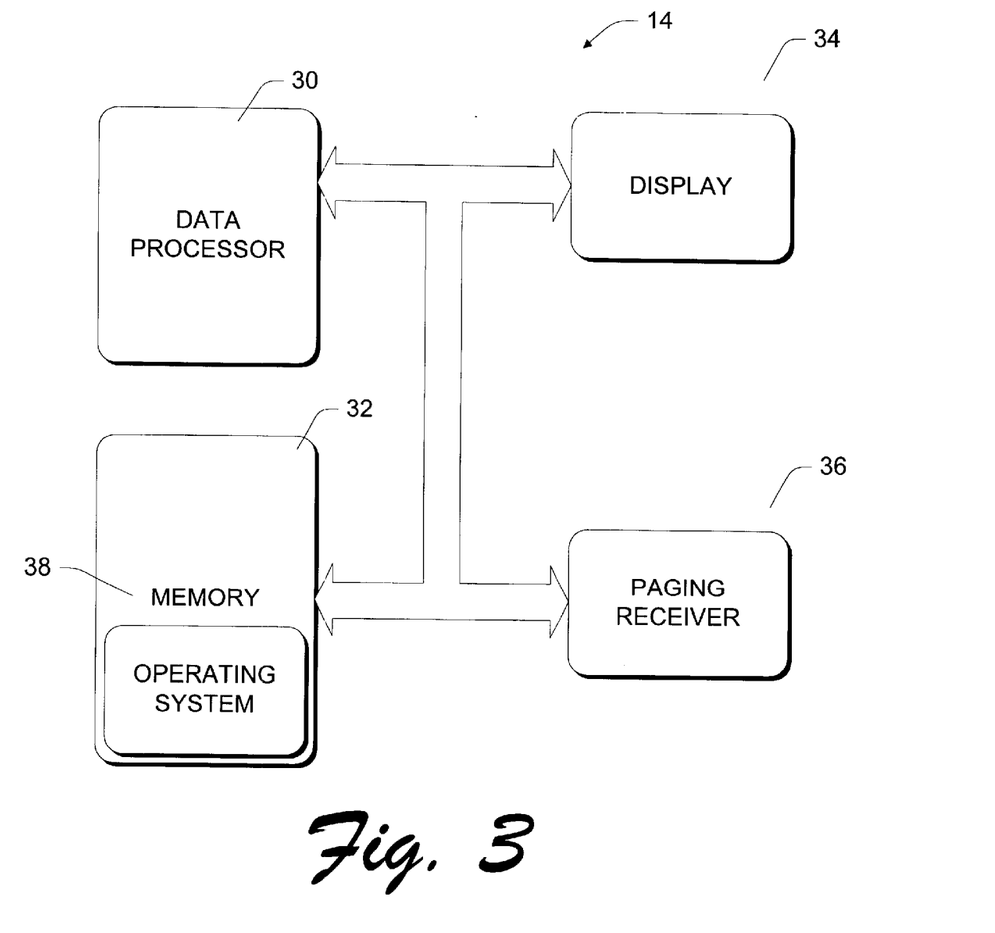
FIG. 3 is a block diagram showing pertinent components of a PDA in accordance with the invention.

FIG. 3 shows pertinent components of PDA 14, which include a CPU or data processor 30, memory 32, display 34, and a paging network receiver 36, all connected by appropriate signal busses. An operating system or program 38, which resides in memory 32, is executed by data processor 30. The particular selection of hardware components is not critical for purposes of the claimed invention.

The invention includes methods, data structures, and functionality that are implemented in both host computer 12 and PDA 14.

In the preferred embodiment of the invention, host computer 12 is programmed to create a time-triggered data object as an independent data structure, and to provide this independent data structure to PDA 14. The data structure specifies a single event in terms of an action and an initiation time. The initiation time indicates when the action is to be initiated.

The data object is an independent data structure in that it can exist and be transferred as an integral, self-contained unit between different computers, processors, and/or programs; it contains the data necessary to specify an event; and it is not required to be part of a table or other data structure that specifies a plurality of events. In addition, the time-triggered data object is preferably formatted in a way that is independent of any particular host computer or PDA. In other words, the same format is used regardless of either the source or destination of the data object.

PDA 14 is configured to receive and accept a time-triggered data object through transmission medium 16, to store one or more of such data objects in its memory, and to initiate the action specified in the data object at the specified time. Rather than storing the objects themselves, the PDA might compile a database or listing of events in a format that is optimized for the operating software of the PDA.

Figure 4:
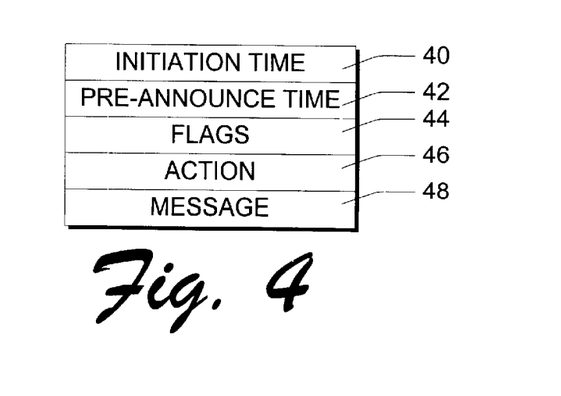
FIG. 4 shows a time-triggered data object in accordance with the invention.

FIG. 4 shows an example format of a data object in accordance with the invention. It comprises five fields, including a field 40 specifying the initiation time, a field 42 specifying a pre-announce time, a field 44 containing one or more flags, a field 46 specifying an action to be performed, and a field 48 specifying an optional textual message to be displayed to a user in conjunction with the action. Field 40 specifies the actual date and time of day that the action is to be initiated. Field 42 contains a value indicating a time before the initiation time for alerting a user to a pending action. Periods of seconds, minutes, hours, and days can be specified in field 42. The flags of field 44 control how the action and following message bytes are interpreted. They also indicate whether the action is to be performed on a recurring basis, such as daily, weekly, monthly, or yearly.

Field 46 can specify different types of actions. Generally, a PDA action is an action that is executable on a PDA. For example, an action might consist of alerting a user by an audible and/or visible alarm. Another type of action might comprise simply displaying a message. Another action might comprise performing system-related functions or changing system-related settings. For instance, such an action might consist of turning off the paging receiver. Another such action, which might be programmed to occur in the evening, would comprise setting a system option so that any user input would turn on a display backlight for a few minutes. An action could be specified to occur in the morning to turn this option back off. A still different type of action could place an icon on the user's display to remind the user days in advance of an event such as an anniversary.

A particular object can also specify its action to be the execution or launching of an application program. This allows an almost endless variety of actions that extend system features. For example, an application can be launched to check if the device is unlocked, and then either lock the device automatically or remind the user to lock it. Many computer devices can be locked to prevent unauthorized use or tampering. In the past, unlocking such a device required the user to enter a password or to perform some other equally troublesome action. When using the invention, however, locking and unlocking can occur automatically at times specified by the user.

Another example of an application that might be launched by an object is an application that scans all messages for a certain word (such as "URGENT") and flags those messages to the user.

In the exemplary embodiment, the application program is executable by the PDA in conjunction with the operating system. The operating system is configured to execute application programs that are stored locally—on the PDA—and also to receive applications from host computer 12 through transmission medium 16. Such applications can be executed at the user's command. In addition, the PDA is configured to store such downloaded application programs and to execute them at the times specified by particular data objects.

If the PDA is or incorporates a cellular telephone, the action can comprise dialing a specified number to download current information. A parent could program their home number to make sure children call home at appointed times. If the PDA is a two-way pager, an action could send a particular message at a specified time. As another example, an application could start an interactive learning application that would quiz a user on a certain subject—such as a foreign language, English vocabulary, state capitols, etc. These functions can be implemented as operating system features or by application programs specified as actions.

The most common use of time-triggered data objects will be for simple reminders, such as appointments and alarms. For an appointment, as an example, the user specifies the time of the appointment. The action field of the data object is set to indicate a default appointment action, such as giving an audible and visual reminder at a time before the actual appointment (as determined by the value of the pre-announce time in field 42). It could give another reminder at the actual appointment time. The content of the message field of the data object is displayed to the user in conjunction with the appointment.

Alarms are implemented similarly, with the pre-announce time normally set to zero. "Snooze" functions can also be implemented, allowing the user to postpone the audible reminder.

In the exemplary embodiment, time-triggered data objects are just one type of available data object. PDA 14 is configured to receive data objects of different types. Each data object is associated with an identifier indicating its type, which is transmitted along with the data object or as part of the data object. The different types of data objects include time-triggered data objects as already described, as well as an application type of data object containing an application program. There is also a data object of a "data" type, containing data that is used by an application program.

The different types of data objects are transferred from host computer 12 to PDA 14 using transmission medium 16. If the transmission medium is a paging network or similar system, this transfer can take place automatically over the paging channel, without requiring intervention by the user of the PDA. In this case, the operating system of the PDA is configured to automatically receive data objects that are part of a wireless page transmission over the paging channel, and to detect when such pages contain data objects. The operating system is further configured to notify the user upon receiving a data object, and to allow the user to is accept or reject individual data objects.

The preferred embodiment of the invention utilizes a graphical user interface. Appropriate functions are provided allowing the user to accept, review, rearrange, and delete various objects or events. The user interface and the operating system furthermore allow the user to create locally formulated time-triggered data objects, in addition to accepting remotely created data objects from host computer 12. For example, the user can set appointments and alarms locally, without the participation of host computer 12.

In the preferred embodiment of the invention, each downloaded application program is assigned a unique identifier. Data objects are also identified by such identifiers, so that the operating system of the PDA can match data objects to applications that use them.

Figure 5:
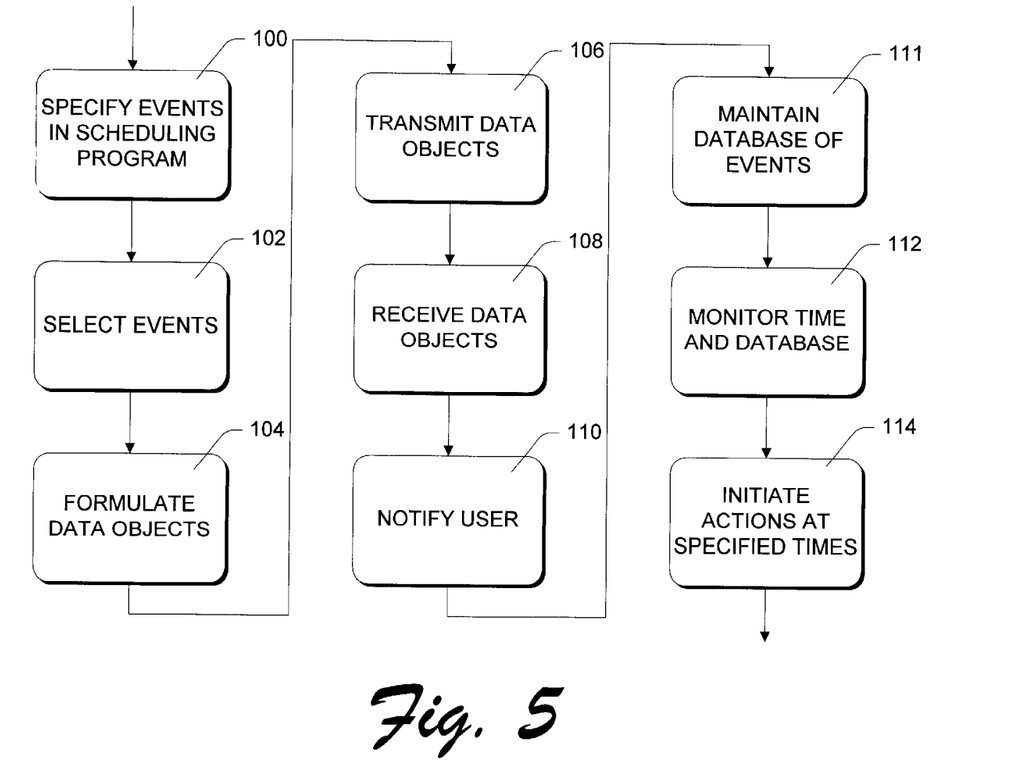
FIG. 5 is a flow chart showing preferred methodological steps in accordance with the invention.

FIG. 5 shows steps employed in the preferred embodiment of the invention, for instructing a PDA to perform an action at a specified time. A step 100 comprises using a scheduling program on a computer (such as host computer 12 of FIG. 1) to specify a plurality of events. The scheduling program is configured especially for use in conjunction with PDA 12, in that it has functions allowing a user to create and send events that can be executed by PDA 12.

A step 102 comprises selecting an event from the plurality of events to send to the PDA. In practice, the scheduling program will allow the user to select more than one event to be sent to the PDA.

A step 104 comprises formulating a data object for the selected event in accordance with the format of FIG. 4. The data object specifies an event in terms of an action and a corresponding initiation time for initiating the action.

A step 106 comprises transmitting the time-triggered data object to a PDA as an independent data structure. If the user has selected a plurality of events for sending, independent data objects are transmitted for each event. If the PDA is capable of receiving pages, this step comprises sending the data object to the PDA as part of a page. In other cases, this step comprises using another type of communications media to transmit the data object to the PDA.

The remaining steps are implemented by an operating system or program in the PDA. A step 108 comprises receiving a plurality of independent data objects, at least some of which have been pre-formulated by the scheduling program as time-triggered data objects in accordance with the discussion above. If the PDA is capable of receiving pages, this step comprises automatically receiving such pages from a paging system without intervention by a user of the PDA. The data objects are contained in the pages. In other cases, the data objects might be received using a wireless transmission medium such as an infrared communications signal or a cellular telephone network.

A step 110 comprises notifying the user upon receiving a data object. The user is given the opportunity to accept or reject the data object.

A step 111 comprises maintaining a database of events that have been specified by received data objects. A further step 112 comprises monitoring the current date and time, while also monitoring the database and optionally alerting a user prior to the times specified in the data objects. As discussed, each time-triggered data object includes a pre-announce time indicating a time before the initiation time when the user should be alerted.

A step 114 comprises initiating the specified actions in the PDA at the times specified in the data objects. Depending on the action specified in a particular data object, this may consist of executing an application program. Such an application program might be one that is already present at the PDA, or it may be a program that is received by the PDA as an application type of data object.

The invention allows a PDA to be programmed in a convenient and flexible way. Time-triggered objects or events can be received automatically in many cases, and can originate from different sources—with or without the participation of the user of the PDA.

The ability to download application programs and to specify them as actions in time-triggered data objects is another feature that is of tremendous value, in that it allows the functionality of a portable device to be extended in many different ways, even after the device has been manufactured and sold.

This ability is particularly useful in very small PDAs that have extremely limited resources and operator interface components, such as pagers and even programmable watches. Such devices typically lack full-fledged operating systems and operator input features. Even so, the invention allows complex capabilities to be programmed into these devices.

In compliance with the statute, the invention has been described in language more or less specific as to structural and methodological features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A system comprising:
   a PDA;
   a computer that is programmed to create a data object as an independent data structure specifying an event in terms of a PDA action and a time for initiating the PDA action, wherein a PDA action is performed by logic within the PDA, the logic being independent of the data object;
   a transmission medium to convey the data object to the PDA;
   the PDA being configured to receive the data object and to initiate the specified PDA action at the specified time.

2. A system as recited in claim 1, further comprising:
   an application program that is a PDA action;
   wherein a particular data object can specify its PDA action to be the execution of the application program;
   wherein the PDA executes the application program at the time specified by the particular data object.

3. A system as recited in claim 1, further comprising:
   a program that is a PDA action, the PDA being further configured to receive the program from the computer through the transmission medium;
   wherein a particular data object can specify its action to be the execution of the program;
   wherein the PDA executes the program at the time specified by the particular data object.

4. A system as recited in claim 1, wherein the transmission medium is a paging channel, the PDA receiving the data object via the paging channel.

5. A system as recited in claim 1, wherein the transmission medium is a paging channel, the PDA automatically receiving the data object as part of a page over the paging channel without intervention by a user of the PDA.

6. A system as recited in claim 1, wherein the transmission medium is a paging channel, the PDA automatically receiving the data object as part of a page over the paging channel without intervention by a user of the PDA, wherein the PDA notifies the user upon receiving the data object.

7. A system as recited in claim 1, wherein the transmission medium comprises an infrared communications signal.

8. A system as recited in claim 1, wherein the computer comprises another PDA.

9. A method implemented by an operating program in a PDA, comprising:

receiving a plurality of independent data objects, at least some of the data objects specifying events in terms of PDA actions and corresponding times for initiating the PDA actions, wherein a PDA action is performed by logic within the PDA, the logic being independent of the data object;

initiating the specified PDA actions at the corresponding specified times in response to receiving the data objects.

10. A method as recited in claim 9, wherein the receiving step comprises automatically receiving pages from a paging system without intervention by a user of the PDA, the data objects being contained in the pages.

11. A method as recited in claim 9, wherein the receiving step comprises automatically receiving pages from a paging system without intervention by a user of the PDA, the data objects being contained in the pages, and further comprising an additional step of notifying the user upon receiving a data object.

12. A method as recited in claim 9, wherein the receiving step comprises receiving the objects using an infrared communications signal.

13. A method as recited in claim 9, wherein each data object is received as an independent data structure.

14. A method as recited in claim 9, further comprising a step of alerting a user prior to the times specified in the data objects.

15. A method as recited in claim 9, further comprising a step of maintaining a database of events specified by received data objects.

16. A method as recited in claim 9, further comprising a step of executing a PDA action that is an application program in response to an event specified in a particular data object.

17. A method as recited in claim 9, further comprising the following additional steps:
   receiving a PDA action from an external source, wherein the PDA action is an application program;
   executing the application-program PDA action in response to an event specified in a particular data object.

18. A system comprising:
   an operating program for execution on a PDA;
   PDA actions for execution by the operating program;
   the operating program being configured to receive data objects of different types from a remote source;
   each data object being associated with an identifier indicating its type;
   the different types of data objects including a time-triggered type of data object that specifies an event in terms of a PDA action and a corresponding time for initiating the PDA action;
   the operating program being further configured to initiate the specified PDA actions at the corresponding times.

19. A system as recited in claim 18, wherein an application program is a PDA action.

20. A system as recited in claim 18, wherein an application program is a PDA action, wherein the operating program executes said application program in response to an event specified in a particular time-triggered type of data object.

21. A method of instructing a PDA to perform a PDA action at a specified time, the method comprising:
   formulating a data object that specifies an event in terms of a PDA action and a corresponding initiation time for initiating the action;

providing the data object to the PDA as an independent data structure, wherein a PDA action is performed by logic within the PDA, the logic being independent of the data object.

22. A method as recited in claim 21, further comprising a step of initiating the specified PDA action in the PDA at the initiation time.

23. A method as recited in claim 21, wherein the providing step comprises sending the data object to the PDA in a page.

24. A method as recited in claim 21, wherein the providing step comprises using a wireless communications signal to transmit the data object to the PDA.

25. A method as recited in claim 21, wherein the providing step comprises using an infrared communications signal to transmit the data object to the PDA.

26. A method of instructing a PDA to perform a PDA action at a specified time, the method comprising:

using a scheduling program on a computer to specify a plurality of events;

selecting an event from the plurality of events to send to a PDA;

formulating a data object for the selected event, said data object specifying the event in terms of a PDA action and a corresponding initiation time for the PDA action;

transferring the data object to the PDA as an independent data, wherein a PDA action is performed by logic within the PDA, the logic being independent of the data object.

27. A method as recited in claim 26, further comprising the following additional steps:

receiving the data object at the PDA;

initiating the specified PDA action in the PDA at the initiation time.

28. A method as recited in claim 26, wherein the transferring step comprises sending the data object to the PDA in a page.

29. A method as recited in claim 26, wherein the transferring step comprises using a wireless communications signal to transmit the data object to the PDA.

30. A method as recited in claim 26, wherein the transferring step comprises using an infrared communications signal to transmit the data object to the PDA.

31. A system comprising:

a PDA;

a computer that is programmed to create a data object as an independent data structure specifying an event in terms of a PDA action and a time for initiating the PDA action;

a transmission medium to convey the data object to the PDA;

the PDA being configured to receive the data object and to initiate the specified PDA action at the specified time;

the PDA being configured to notify a user of the PDA upon reception of the data object.

32. A system as recited in claim 31, the PDA being configured to prompt the user to choose whether to accept the data object.

33. A system as recited in claim 31, wherein the transmission medium is a paging channel, the PDA receiving the data object via the paging channel.

34. A system as recited in claim 31, wherein the transmission medium is a paging channel, the PDA automatically receiving the data object as part of a page over the paging channel without intervention by a user of the PDA.

35. A system as recited in claim 31, wherein the transmission medium is a paging channel, the PDA automatically receiving the data object as part of a page over the paging channel without intervention by a user of the PDA, wherein the PDA notifies the user upon receiving the data object.

36. A system as recited in claim 31, wherein the transmission medium comprises an infrared communications signal.

37. A system as recited in claim 31, wherein the computer comprises another PDA.

38. A method implemented by an operating program in a PDA, comprising:

receiving a plurality of independent data objects, at least some of the data objects specifying events in terms of PDA actions and corresponding times for initiating the PDA actions;

notifying a user of the PDA upon receiving of the data objects specifying events;

initiating the specified PDA actions at the corresponding specified times in response to receiving the data objects.

39. A method as recited in claim 38, wherein the notifying step comprises prompting the user to choose whether to accept the data object specifying events.

40. A method as recited in claim 39, wherein before the initiating step, proceeding to the initiating step only for the specified PDA actions of the data objects that were accepted by the user.

41. A method as recited in claim 39, wherein before the initiating step, skipping the initiating step only for the specified PDA actions of the data objects that were not accepted by the user.

42. A method of instructing a PDA to perform a PDA action at a specified time, the method comprising:

using a scheduling program on a computer to specify a plurality of events;

selecting an event from the plurality of events to send to a PDA;

formulating a data object for the selected event, said data object specifying the event in terms of a PDA action and a corresponding initiation time for the PDA action;

transferring the data object to the PDA as an independent data structure;

receiving the data object at the PDA;

notifying a user of the PDA about the receiving the data object at the PDA;

initiating the specified PDA action in the PDA at the initiation time.

43. A method as recited in claim 42, wherein the notifying step comprises prompting the user to accept the data object.

44. A method as recited in claim 43, wherein before the initiating step, proceeding to the initiating step only for the specified PDA actions of the data objects that were accepted by the user.

45. A method as recited in claim 43, wherein before the initiating step, skipping the initiating step only for the specified PDA actions of the data objects which were not accepted by the user.

* * * * *

UNITED STATES PATENT AND TRADEMARK OFFICE
CERTIFICATE OF CORRECTION

PATENT NO.     : 6,356,956 B1
DATED          : March 12, 2002
INVENTOR(S)    : Deo et al.

It is certified that error appears in the above-identified patent and that said Letters Patent is hereby corrected as shown below:

Column 3,
Line 28, change "RE" to -- RF --.

Column 5,
Line 55, delete "is" before "accept".

Column 7,
Line 23, after "PDA" insert -- , which is a lightweight, compact, portable electronic personal organizer --.
Line 67, after "PDA," insert -- which is a lightweight, compact, portable electronic personal organizer, the method --.

Column 8,
Line 43, after "PDA" insert -- , which is a lightweight, compact portable electronic personal organizer --.
Line 63, before "to" insert -- , which is a lightweight, compact, portable electronic personal organizer, --.

Column 9,
Line 16, before "to" insert -- , which is a lightweight, compact, portable electronic personal organizer, --.
Line 46, after "PDA" insert -- , which is a lightweight, compact, portable electronic personal organizer --.

UNITED STATES PATENT AND TRADEMARK OFFICE
CERTIFICATE OF CORRECTION

PATENT NO.  : 6,356,956 B1
DATED       : March 12, 2002
INVENTOR(S) : Deo et al.

It is certified that error appears in the above-identified patent and that said Letters Patent is hereby corrected as shown below:

<u>Column 10,</u>
Line 1, after "PDA," insert -- which is a lightweight, compact, portable electronic personal organizer, the method --.
Line 37, after "PDA" insert -- , which is a lightweight, compact, portable electronic personal organizer, --.

Signed and Sealed this

First Day of October, 2002

Attest:

JAMES E. ROGAN
Attesting Officer        Director of the United States Patent and Trademark Office